Figure 1:
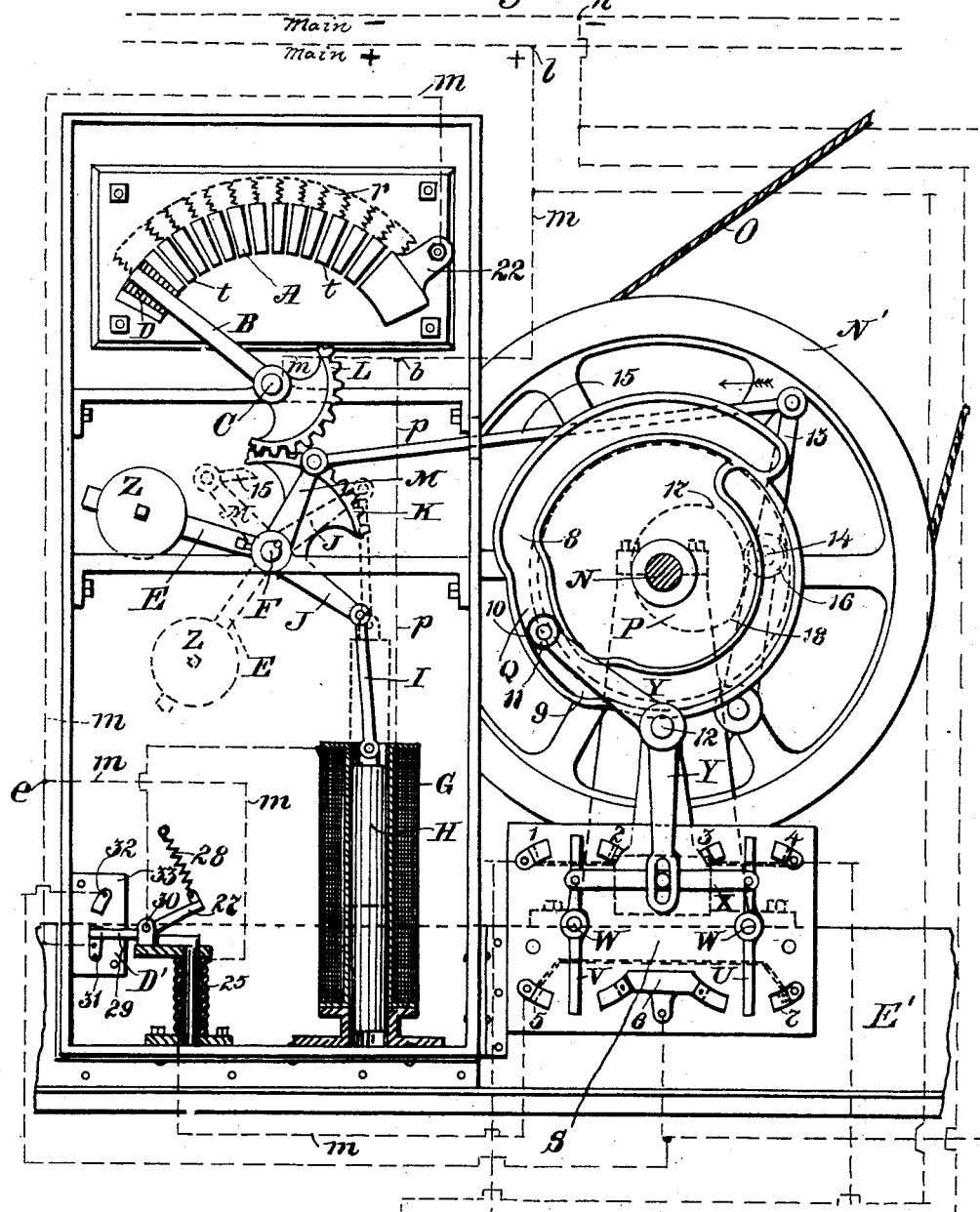

(No Model.) 2 Sheets—Sheet 1.

J. W. MOORE.
STARTING AND CONTROLLING DEVICE FOR ELECTRIC MOTORS.

No. 516,831. Patented Mar. 20, 1894.

WITNESSES:

INVENTOR
Joseph W. Moore (No Model.) 2 Sheets—Sheet 2.
J. W. MOORE.
STARTING AND CONTROLLING DEVICE FOR ELECTRIC MOTORS.
No. 516,831. Patented Mar. 20, 1894.

WITNESSES:

INVENTOR
Joseph W. Moore

UNITED STATES PATENT OFFICE.

JOSEPH W. MOORE, OF BOSTON, MASSACHUSETTS.

STARTING AND CONTROLLING DEVICE FOR ELECTRIC MOTORS.

SPECIFICATION forming part of Letters Patent No. 516,831, dated March 20, 1894.

Application filed November 25, 1893. Serial No. 492,029. (No model.)

*To all whom it may concern:*

Be it known that I, JOSEPH W. MOORE, a citizen of the United States, residing at Boston, in the county of Suffolk and State of Massachusetts, have invented certain Improvements in Starting and Controlling Devices for Electric Motors, of which the following is a specification.

My invention relates to certain improvements in controlling devices for electric motors, and is adapted particularly for use on electric motors for constant potential circuits employed for operating elevators where the motor is started and stopped at the will of the operator from the car or platform.

It is well known that in shunt-wound motors the armature is of very low resistance, making it necessary to interpose in the armature circuit a variable resistance which can be gradually cut out as the motor gets up to speed. In starting there is enough resistance in the rheostat to permit only the minimum amount of current to flow through the armature, and as the armature starts and accelerates in speed the counter electro-motive force increases, thus keeping down the current within the capacity of the armature wires. Should there be no outside resistance in the armature circuit, or should the resistance be cut out faster than the acceleration of the speed of the armature and consequently faster than the counter electro-motive force (which is dependent on the speed of the armature) could generate and keep down the current within the safety limit, the safety catches would fuse, causing the inconvenience and expense of replacing them, or possibly causing injury to the armature or to the insulation on the line. Of course this difficulty is easily overcome in the case of stationary motors where the attendant can stand at the rheostat within sight of the motor and by watching the motor, cut out the resistance by hand at the same rate at which the armature gets up to speed; but where the conditions are such that the motor is not in sight of the operator, which is the case in the controlling of electric motors on elevator machinery, it is apparent that some automatic device is necessary for retarding the operation of cutting out said resistance in such a manner that the operator cannot by cutting out the resistance too rapidly cause an abnormal amount of current to be admitted to the armature circuit, thus causing a jumping of lights which may be on the same circuit with the motor, or otherwise injuring the service on the circuit. Also in the case of motors, say above ten horse power, when the current required to start the motor with its maximum load is so great that should it be suddenly admitted to the circuit it would momentarily lower the voltage enough to be detrimental to the proper operation of other apparatus on the same circuit, this starting current must be gradually and not suddenly admitted. In order to overcome these difficulties and to accomplish the desired results stated above, many devices have been invented which are more or less defective. I will here mention some of the devices which have for their object to properly start and control shunt-wound constant potential motors, and call attention to some of the points wherein they fail to accomplish the result sought. A resistance connected to blocks, said resistance being cut out successively on said blocks by the contact of brushes attached to an arm and leading the current off to the armature of the motor, is common to all. Now it becomes necessary to automatically move the said arm across the said contact-blocks and to retard its movement so that the motor will have sufficient time to accelerate in speed as fast as the resistance is being cut out. One, among the various ways of accomplishing this, is to have the operator by means of a rope or lever connected with the machine, release a weight, which by gravity gives motion to a rheostat arm, the movement of said weight being retarded by an oil dash-pot or air suction or compression, or by equivalent means. In other devices a solenoid is employed, whereby the operator in the usual manner applies by means of a rope or lever, the current to said solenoid, which in turn actuates the rheostat arm, the action of the solenoid being retarded by a dash-pot, a balance wheel, or a centrifugal or other mechanical device. In the cases mentioned it is obvious that when the rheostat arm is released or the automatic device given control of the rheostat, provided the device operates as intended, the rheostat arm will continue its motion until the resistance is all cut out, and should the motor be too heavily loaded or for any other cause refuse to start, the current would exceed the safety limit and blow out the fuses or burn out the armature, which is obviously a serious defect. In devices where oil retarders are employed, other defects are apparent, inasmuch as the oil wastes away, causing the resistance to be cut out too rapidly, or is influenced by the weather, congealing when cool and causing the apparatus to stick and stop. In view of the above named facts it is evident that where motors are liable to be started with a load, the controlling apparatus, to be perfect, must cut out the resistance only at such a rate that the safety limit of current cannot be exceeded, or in other words the rheostat arm must keep pace with the increasing speed and consequent increasing counter-electro-motive force of the motor, and should the motor refuse to start or cease to accelerate, the rheostat arm should remain at the point reached when acceleration ceases. Again should the motor in any way be retarded after the external resistance has been once entirely cut out, or for any reason should the current in the armature circuit exceed to a dangerous degree the normal current of the motor, the resistance should be automatically put into the circuit in time to save the motor.

In applying my invention I have two objects in view, viz: first, to automatically cut out the external resistance of the armature circuit at the same rate at which the motor accelerates in speed until full speed is acquired, never permitting a dangerous amount of current to flow in the circuit after the starting current has been admitted, and second, to automatically cut in again the same resistance should the normal amount of current be exceeded from any cause to a dangerous degree.

Having briefly explained the objects to be attained, and some of the most serious defects of existing apparatus, I will proceed to explain my invention which obviates the difficulties referred to and attains the desired results above stated.

Figure 2:
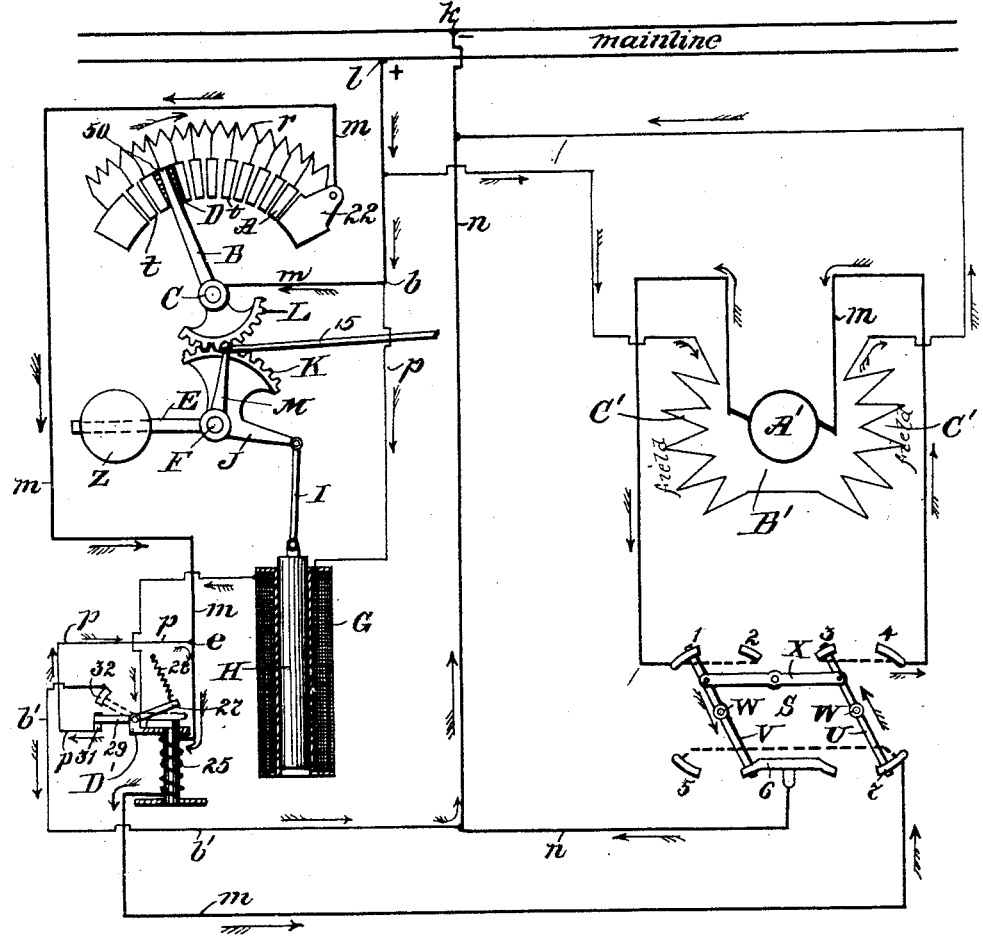

Referring to the accompanying drawings showing one form of carrying my invention into effect in its application to an electric-motor used for operating elevator hoisting machinery,—Figure 1 is a side elevation of my improved starting and controlling device for electric motors, showing the motor and wiring in diagram. Fig. 2 is a diagrammatic view showing the electrical connections and paths of currents.

A represents the rheostat consisting of a resistance $r$ connected to the contact-blocks $t$.

B is the rheostat-arm pivoted at C and carrying the brushes D which in turn bear on the contact blocks $t$.

E is an adjustably weighted lever capable of being shifted around and fastened to a shaft F in any desired position, preferably by means of a set screw as shown.

G is a helix or solenoid included in one branch of the armature circuit of the motor B′ and in parallel with the resistance $r$. The core H of the solenoid G has connection by means of the link I, segment-lever J, and segment-gears K and L to the rheostat arm B; the weighted lever E, the segment-lever J, K, and a lever M being all fastened to and moving with the shaft F having its bearings in a suitable support in the casing of the apparatus.

N is a shaft, to which, in the present instance, is secured a rope wheel N′ capable of being rotated in either direction from an elevator car, not shown, by means of the ordinary hand-rope O, and to this shaft N are secured two cams P and Q.

S is a switch by which the armature circuit is opened and closed and the direction of the current in the armature changed at the will of the operator. This switch consists of the two contact-arms U and V, each pivoted at W and connected together by the insulated link X, and the contact blocks 1, 2, 3, 4, 5, 6, and 7. The contacts 1 and 2 are connected together and insulated from the contacts 3 and 4, which are also connected together. The contact blocks 5 and 7 are connected together and insulated from the block 6. In order to open and close the circuit the arms V and U are moved on and off of the contact blocks by means of the slotted bell-crank-lever Y, which derives its motion from the grooved cam Q as the points 8 or 9 pass the point 10, operating on the roll 11, which is fixed to the lever Y, which is pivoted at 12.

The lever 13, which has a roll 16 attached thereto at the point 14 engaging with the cam P, shown dotted, is connected with the lever M, which is secured to the shaft F, by the rod 15, and holds the rheostat-arm B in the position shown in Fig. 1, while the roll 16 is in contact with the dwell from 17 to 18, as shown in Fig. 1. As soon as one of the points 17 or 18 of cam P (depending on the direction of rotation) passes the roll 16, the rheostat arm B will commence to move to the right actuated by the weight Z, and will continue to cut out the resistance as fast as the cam P permits the lever 13 to move to the left, as indicated by the arrow, Fig. 1, until the cam P has completed a half revolution, at which time the brushes D will have reached the terminal block 22 provided the motor has started and accelerates in speed as fast as the resistance is cut out. At the time that the point 17 or 18 of the cam P passes the roll 16 as above described, one of the points 8 or 9 on the cam Q as the case may be, also passes the roll 11, thus operating the switch S and closing the armature circuit, admitting the minimum amount of current to the armature and energizing the solenoid G, the current in said solenoid being of a strength due to the relative resistances of the said solenoid and rheostat resistance $r$.

Assuming my device to be attached to an elevator mechanism having for its motive power an electric motor B', which, when loaded to its full capacity, requires sixty ampères of current, and also that sixty ampères is the limit of the current which the armature wires will possibly carry without injury, and that it is desired to raise this maximum load and the operator pulls the hand rope O until the cams P and Q make one half a revolution, it will be seen by referring to the drawings that the following operation takes place: Supposing that the field circuit C' of the motor has been previously closed by closing the line switch, not shown, and the fields energized and the armature circuit closed by the switch S as shown in Fig. 2, the current passing from the main line at $l$ by line $m$ takes the direction shown by the arrows and divides at $b$, one portion of the current going through the resistance $r$, helix 25, to be hereinafter described, reversing switch S, armature A' and back by line $n$ through the switch S and into the main line at $k$. The other portion of the current starting at $b$ flows through the line $p$ in parallel with the resistance $r$, energizes the retarding solenoid G, and passes through the arm 29 and contact block 31 of an automatic safety switch D' and continues through the line $p$ and unites with the branch $m$ at $e$. As soon as the armature circuit is closed in the manner described, the solenoid G is energized and will draw the core H to a central position in the helix as fast as the action of the cam P will permit the lever 13 to respond to the force of the weight Z and the solenoid G. Up to this time the weight Z and solenoid G act in harmony, combining their forces to move the rheostat-arm B across the contacts $t$ from left to right to the position shown in Fig. 2. The gradation of the resistance $r$ is such that on reaching the point 50, Fig. 2, the arm B has cut out enough resistance to admit the sixty ampères of current to the armature providing the motor does not start until this point is reached.

The solenoid G and weight Z are so proportioned that when the maximum current due to the resistance of helix G flows through the same it is sufficient to balance the weighted lever E and parts connected therewith, and hold the rheostat-arm B in the position shown in Fig. 2 into which it was left by the movement of the core H to its central or neutral point. It is obvious that if the motor is not loaded beyond its capacity, it will now start, and of necessity accelerate sufficiently to generate enough counter-electro-motive force to weaken the solenoid G and permit the arm B to continue its motion, cutting out more and more of the resistance $r$ from the armature circuit until it is entirely cut out, when the current, which has been growing less and less in the solenoid G owing to the influence of the naturally increasing counter electro motive force, will be short circuited into the line $m$. Should the motor refuse to start with the sixty ampères of current no more resistance would be cut out until the load had been lightened to the capacity of the machine, allowing the motor to start.

In my device the rheostat arm cannot race across the contacts $t$ for two reasons, first, the natural action of a uniformly wound solenoid is such that the maximum pull on the core is when said core is a little less than half way out of the helix, in this case (the current remaining constant) when the core has reached the position shown by dotted lines in Fig. 1; and by moving the core H either way from this point the pull grows less and less until the core is out of the influence of the helix or until the core has again reached its neutral position, consequently the helix G only releases the core H in proportion to the weakening influence of the counter-electro-motive force on the circuit; second, I do not depend entirely on the aforesaid action of the solenoid as this increase from zero to maximum pull may not be sufficient to balance the influence of the increasing counter-electro-motive force in the circuit while the motor is accelerating, but it will be seen that the weighted lever E may be adjusted on the shaft F into such a position as to cause it to swing inward more or less toward a vertical plane passing through its fulcrum, its leverage being thus decreased as it approaches said vertical plane, which is equivalent to a proportionate increase in the strength of the solenoid. Neither do I confine myself to this means of decreasing said actuating force of the arm B, inasmuch as I could substitute for the weight Z a spring whose tension would diminish as the arm B cut out the resistance.

It is to be particularly noticed that in the operation of my device as described, the strength and operation of the retarding solenoid G are not dependent on the strength of the current in the armature circuit, inasmuch as that branch of the armature circuit in which the solenoid G is interposed is of constant resistance and independent of the variable resistance $r$; therefore the current in said solenoid and consequently the force of the same is also constant until the armature starts, independent of the strength of the current which flows to said armature; and after starting, the current will gradually diminish in the helix C until the motor attains its maximum speed, said motor not attaining full speed until the resistance $r$ is entirely cut out.

To show if possible more clearly that the strength of the solenoid G is not dependent on the strength of the armature current, let it be supposed that the resistance $r$ is cut out exactly at the same rate as the acceleration of speed of the armature, then the current in the armature circuit would remain constant from the time the armature A' started; and notwithstanding this fact the solenoid would gradually weaken at the same rate of acceleration of the armature A' until the resistance $r$ was entirely cut out and the solenoid practically short circuited, showing conclusively that the weakening of the solenoid G was entirely due to the influence of the increasing counter-electro-motive-force generated by the armature.

I have further provided a safety device for my motor which I will now describe. The electro magnet 25 of the safety switch D' previously referred to is connected in the armature circuit in such a manner that the whole current flowing to the armature passes through said electro magnet. The pivoted armature 27 of the magnet 25 is drawn away from the same into the position shown by a tension spring 28, so adjusted that the armature 27 will not be attracted to the magnet until the current in the armature circuit exceeds the safety limit. 29 is a switch arm fastened to or forming a part of the armature 27, and 31 and 32 are contact blocks mounted on the insulated base 33. Should the current ever exceed the safety limit in the armature circuit, (sixty amperes) which could only occur after the core H had passed its predetermined neutral position shown in Fig. 2, the magnet 25 would immediately attract its armature 27, overcoming the force of the spring 28 and throwing the switch-arm 29 from the block 31 to the block 32, which as will be seen, would change the direction of the current passing through the solenoid G, diverting it from the armature by the wire $p$ and directing it through the wire $b'$ to the line $n$, thus instantly putting the solenoid C in parallel with the armature A' and removing it from the influence of the counter-electro-motive force of the circuit and energizing the solenoid G to its maximum strength, pulling the rheostat arm B back to the position shown in Fig. 2 and cutting in the resistance $r$ until the current is reduced in the armature circuit to the safety limit, thus saving the motor from injury. The operator would then open the circuit by rotating the cams P and Q back to the position shown in Fig. 1, when everything will be at rest, the magnet 25 then losing its magnetism, when the spring 28 will return the switch arm 29 back to the block 31 and the machine will then be ready for another start.

What I claim as my invention, and desire to secure by Letters Patent, is—

1. In a starting and controlling device for electric motors, the combination of an armature circuit divided into two branches or lines, one of which is provided with a variable resistance and the other with a constant resistance, a helix or solenoid forming the whole or a part of said constant resistance, a switching device for opening and closing the armature circuit, a contact-arm adapted to cut in and out said variable resistance, said contact-arm being connected with the core of the solenoid and with the starting mechanism controlled by the operator, the operation of said solenoid being dependent upon the influence of the counter electro motive force of the armature, and entirely independent of the strength of the current in the armature circuit, substantially as set forth.

2. In a starting and controlling device for electric motors, the combination of the armature circuit, a switching device for closing and opening the said circuit, a variable resistance in said circuit, a contact arm adapted to cut in and out said variable resistance, a weighted lever connected with and adapted to operate the said contact-arm, said weighted lever being connected with the starting mechanism controlled by the operator, a helix or solenoid included in a shunt of the armature circuit and having its core connected with said weighted lever and adapted to control the movement of the contact-arm, the operation of said solenoid being dependent on the influence of the counter-electro-motive force of the armature, and entirely independent of the strength of the current in the armature circuit, substantially as set forth.

3. In a starting and controlling device for electric motors, the combination of the armature circuit, a switching device for closing and opening the said circuit, a variable resistance in said circuit, a contact-arm adapted to cut in and out said variable resistance, a weighted lever connected with and adapted to operate the said contact-arm, said weighted lever being connected with the starting mechanism controlled by the operator, a helix or solenoid included in a shunt of the armature circuit and having its core connected with said weighted arm and adapted to control the movement of the contact-arm, the operation of said solenoid being dependent on the influence of the counter-electro-motive force of the armature, and entirely independent of the strength of the current in the armature circuit, an auxiliary electro-magnet in the armature circuit, a switch connected with the armature of said electro-magnet, one contact of said switch being connected with the solenoid branch of the armature circuit, and the other contact being connected with a line connected with the main line, and adapted to be connected by said switch with said solenoid-branch of the armature circuit, whereby the current is diverted from the armature and caused to pass directly to the main line and the solenoid energized to its maximum strength, substantially as set forth.

4. In a starting and controlling device for electric motors, the combination of the armature circuit, the switch S for closing and opening said circuit, a variable resistance in said circuit, the pivoted contact-arm B provided with a segment-gear L and adapted to cut in and out said variable resistance, the weighted lever E provided with a segment-gear K meshing with the segment-gear L to operate the contact-arm B, the cam P on the controlling shaft N, the lever 13 operated by said cam, the lever M secured to the shaft F of the weighted lever E, the connecting rod 15 pivoted to the lever 13 and to the lever M, the helix or solenoid G included in a shunt of the armature circuit, the lever J secured to the shaft F, the link I pivoted to the lever J and to the core H of the solenoid G, whereby said solenoid is adapted to control the movement of the contact-arm B, the bell-crank-lever Y connected with the switch S, and the cam Q for actuating the lever Y, the auxiliary electro-magnet 25 in the armature circuit, the switch D' connected with the armature of said electro-magnet 25, one contact of said switch being connected with the solenoid-branch of the armature circuit, and the other contact being connected with the main line and adapted to be connected by said switch D' with said solenoid-branch of the armature-circuit, whereby the current is diverted from the armature and caused to pass directly to the main line, and the solenoid energized to its maximum strength, substantially as set forth.

Witness my hand this 22d day of November, A. D. 1893.

JOSEPH W. MOORE.

In presence of—
P. E. TESCHEMACHER,
HARRY W. AIKEN.